(12) United States Patent
Norihisa

(10) Patent No.: US 7,824,105 B2
(45) Date of Patent: Nov. 2, 2010

(54) BEARING AND BEARING APPARATUS

(75) Inventor: Takashi Norihisa, Niwa-Gun (JP)

(73) Assignee: Okuma Corporation, Niwa-Gun (JP)

( * ) Notice: Subject to any disclaimer, the term of this patent is extended or adjusted under 35 U.S.C. 154(b) by 614 days.

(21) Appl. No.: 11/830,185

(22) Filed: Jul. 30, 2007

(65) Prior Publication Data
US 2008/0050060 A1 Feb. 28, 2008

(30) Foreign Application Priority Data
Aug. 24, 2006 (JP) ............... 2006-228242

(51) Int. Cl.
*F16C 33/66* (2006.01)
(52) U.S. Cl. .................. 384/475; 384/466; 384/468
(58) Field of Classification Search .............. 384/462, 384/466, 468, 473–475; 184/6, 6.14, 6.26
See application file for complete search history.

(56) References Cited

U.S. PATENT DOCUMENTS

| | | | | |
|---|---|---|---|---|
| 3,722,967 A | * | 3/1973 | Lewis | ............ 384/466 |
| 4,479,682 A | * | 10/1984 | Olivier | ............ 384/475 |
| 6,261,003 B1 | * | 7/2001 | Dusserre-Telmon et al. | . 384/475 |
| 7,384,197 B2 | * | 6/2008 | Plona | ............ 384/473 |
| 7,500,311 B2 | | 3/2009 | Shimomura | |
| 2006/0159378 A1 | | 7/2006 | Plona | |
| 2009/0129714 A1 | | 5/2009 | Shimomura | |

FOREIGN PATENT DOCUMENTS

| | | |
|---|---|---|
| JP | 50-72044 | 6/1975 |
| JP | 05-060145 | 3/1993 |
| JP | 11-280771 | 10/1999 |
| JP | 2001-090739 A1 | 4/2001 |
| JP | 2004-324811 | 11/2004 |

\* cited by examiner

*Primary Examiner*—Thomas R Hannon
(74) *Attorney, Agent, or Firm*—Burr & Brown

(57) ABSTRACT

In an outer ring, a plurality of lubrication oil flow paths which penetrates from an outer circumference surface of the outer ring to an inner circumference surface (in particular, raceway groove) are provided. Opening positions of the each lubrication oil flow paths are made different in a width direction being orthogonal to a rolling direction of a ball. At least one of the lubrication oil flow paths is used as a lubrication oil supply path, and a lubrication oil discharge path is selected from the other lubrication oil flow paths to adjust a range of lubrication oil amount, so that an amount of lubrication oil in the raceway groove is controlled.

11 Claims, 4 Drawing Sheets

BEARING AND BEARING APPARATUS

BACKGROUND OF THE INVENTION

1. Field of the Invention

The present invention relates to a bearing which rotatably supports a main shaft or the like and a bearing apparatus which controls supply/discharge of lubrication oil for the bearing.

2. Description of the Related Art

In a conventional art, lubrication oil is supplied to a bearing which can rotatably support a main shaft in a housing to achieve lubrication so as to improve stability of a rotating operation or prevent the bearing from being damaged. In general, for example, an oil air scheme as described in Patent Document 1 is used.

[Patent Document] Japanese Unexamined Patent Publication No. 2001-90739

Here, a conventionally known bearing and a bearing apparatus which perform lubrication of the bearing will be described below with reference to FIG. 4. FIG. 4 is an explanatory diagram showing a conventional bearing 41 and a conventional bearing apparatus.

The bearing 41 which rotatably supports a main shaft 51 is an angular ball bearing which is conventionally known. A plurality of bearings 41 are attached along a shaft line of the main shaft 51 in a housing 52. In the housing 52, a supply path 42 which supplies oil air to the bearings 41, and a discharge path 43 to discharge the oil air from the bearings 41. In an oil air supply device (not shown), oil air is fed into the supply path 42 under pressure, and the oil air is supplied to be sprayed from a nozzle-shaped distal end of the supply path 42 onto an inner ring of each bearing 41 or a rolling element 41a. On the other hand, the supplied air and the lubrication oil are discharged from the discharge path 43 to the outside of the housing 52.

As described above, the conventional bearing apparatus performs lubrication of the bearings 41.

In recent years, a reduction in carbon dioxide emission for prevention of global warming is required, and development or the like of a technique which can reduce a consumption of lubrication oil is expected. In this case, even though lubrication oil supplied to a bearing is simply reduced, the bearing may be damaged due to a deficient amount of lubrication oil in the bearing. In contrast to this, when a predetermined amount of lubrication oil which does not cause a lack of lubrication oil in the bearing is periodically supplied, the lubrication oil may be oversupplied. For this reason, it cannot be desired to reduce an amount of consumption of lubrication oil, and heat is generated due to the oversupply to adversely affect machine accuracy of a machine tool. Therefore, an amount of lubrication oil in the bearing must be controlled to an appropriate level without excess and deficiency. However, in the bearing apparatus as described in Patent Document 1, since lubrication oil. (oil air) is supplied into each bearing 41 by being sprayed from the nozzle-shaped distal end of the supply path 42, an amount of lubrication oil apparently supplied into the bearing 41 would not be constant. Thus, an amount of lubrication oil in the bearing 41, in particular, on a rolling contact surface of the rolling element 41a cannot be easily controlled.

SUMMARY OF THE INVENTION

The present invention has been made in consideration of the above problems, and has an object to provide a bearing and a bearing apparatus which can arbitrarily control an amount of lubrication oil in the bearing, eliminate the risk of damaging the bearing and deteriorating machine accuracy, and, consequently reduce an amount of lubrication oil to be used.

In order to achieve the above object, the present invention according to claim 1 provides a bearing including a rolling element between an outer ring and an inner ring wherein a lubrication oil flow path communicating with an area near a rolling contact surface on which the rolling element rolls is provided in the outer ring, so that the lubrication oil can be discharged from inside of the bearing through the lubrication oil flow path.

In one embodiment, the present invention provides a bearing, wherein a plurality of lubrication oil flow paths are provided, and openings near the rolling contact surface of the lubrication oil flow paths are at different positions in a width direction being orthogonal to a rolling direction of the rolling element according to claim 1.

In another embodiment, the present invention provides a bearing wherein, a plurality of lubrication oil flow paths are provided, and at least one of the lubrication oil flow paths is used as a lubrication oil supply path to supply lubricant oil into the bearing according to claim 1 or claim 2.

In order to achieve the above object, the present invention provides a bearing apparatus to control an amount of lubrication oil in the bearing, including supply means to supply lubrication oil into the bearing, discharge means to discharge the lubrication oil from inside of the bearing through a lubrication oil flow path, and control means to arbitrarily operate the supply means and the discharge means.

In one embodiment, the present invention provides a bearing apparatus includes, selection means which selects the lubrication oil flow path to be used to discharge the lubrication oil from inside of the bearing.

According to one embodiment of the present invention, a lubrication oil flow path communicating with an area near a rolling contact surface on which a rolling element rolls is provided in an outer ring, so that the lubrication oil is discharged from inside of the bearing through the lubrication oil flow path. Therefore, in comparison with the conventional bearing, an amount of lubrication oil discharged from the bearing can be accurately controlled, and, consequently, an amount of lubrication oil in the bearing can be arbitrarily maintained. Therefore, damage to the bearing or deterioration of machine accuracy caused by excess and deficiency of the lubrication oil in the bearing can be effectively prevented, and an amount of lubrication oil to be used can be reduced.

According to another embodiment of the present invention, a plurality of lubrication oil flow paths are provided, and openings in the rolling contact surface of the lubrication oil flow paths are at different positions in a width direction being orthogonal to a rolling direction of the rolling element. Thus, one of the lubrication oil flow paths can be selectively used as a lubrication oil discharge path to control a range of the amount of lubrication oil, so that the amount of lubrication oil in the bearing can be kept to be appropriate. Therefore, maintaining an appropriate amount of lubrication oil in the bearing can be realized with a simple configuration.

Furthermore, since at least one of the lubrication oil flow paths is used as a lubrication oil supply path, an amount of lubrication oil supplied into the bearing can be accurately controlled. Therefore, maintaining an appropriate amount of lubrication oil in the bearing and the above effects based on the maintenance can be made more conspicuous.

In addition, the selection means which selects the lubrication oil flow path used to discharge the lubrication oil from the inside of the bearing is provided. Therefore, even though an appropriate amount value of lubrication oil in the bearing changes depending on various conditions, such as a rotating condition of a rotating shaft and an installation condition of the bearing, a lubrication oil discharge path is arbitrarily selected so that an amount of lubrication oil in the bearing and high versatility can be achieved.

DETAILED DESCRIPTION OF THE INVENTION

A bearing and a bearing apparatus according to an embodiment of the present invention will be described below with reference to the drawings. In the embodiment, the bearing will be described as a ball bearing according to an embodiment.

Figure 1:
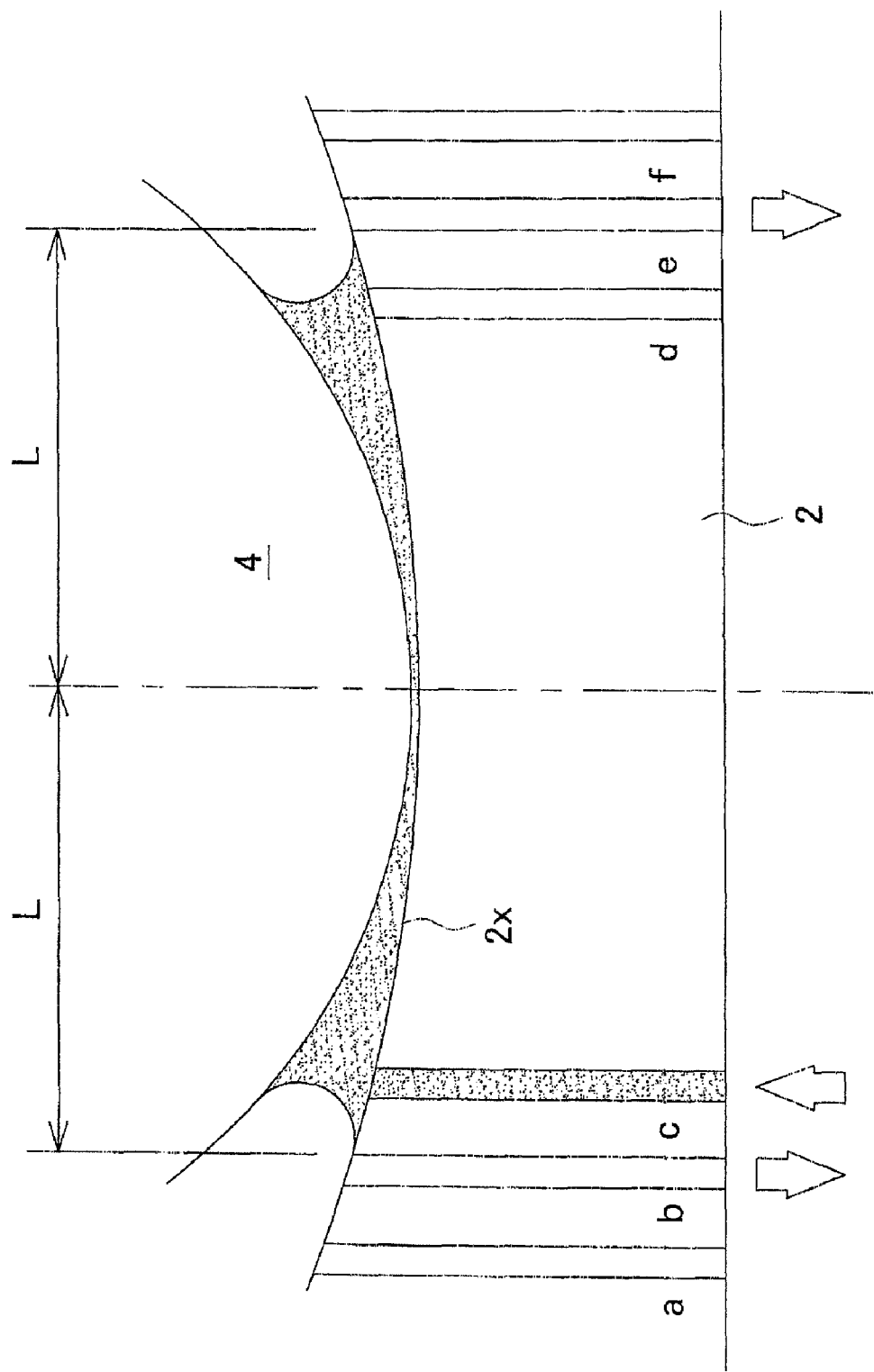
FIG. 1 is an explanatory diagram showing a section of a part of an outer ring of a ball bearing.
Figure 2:
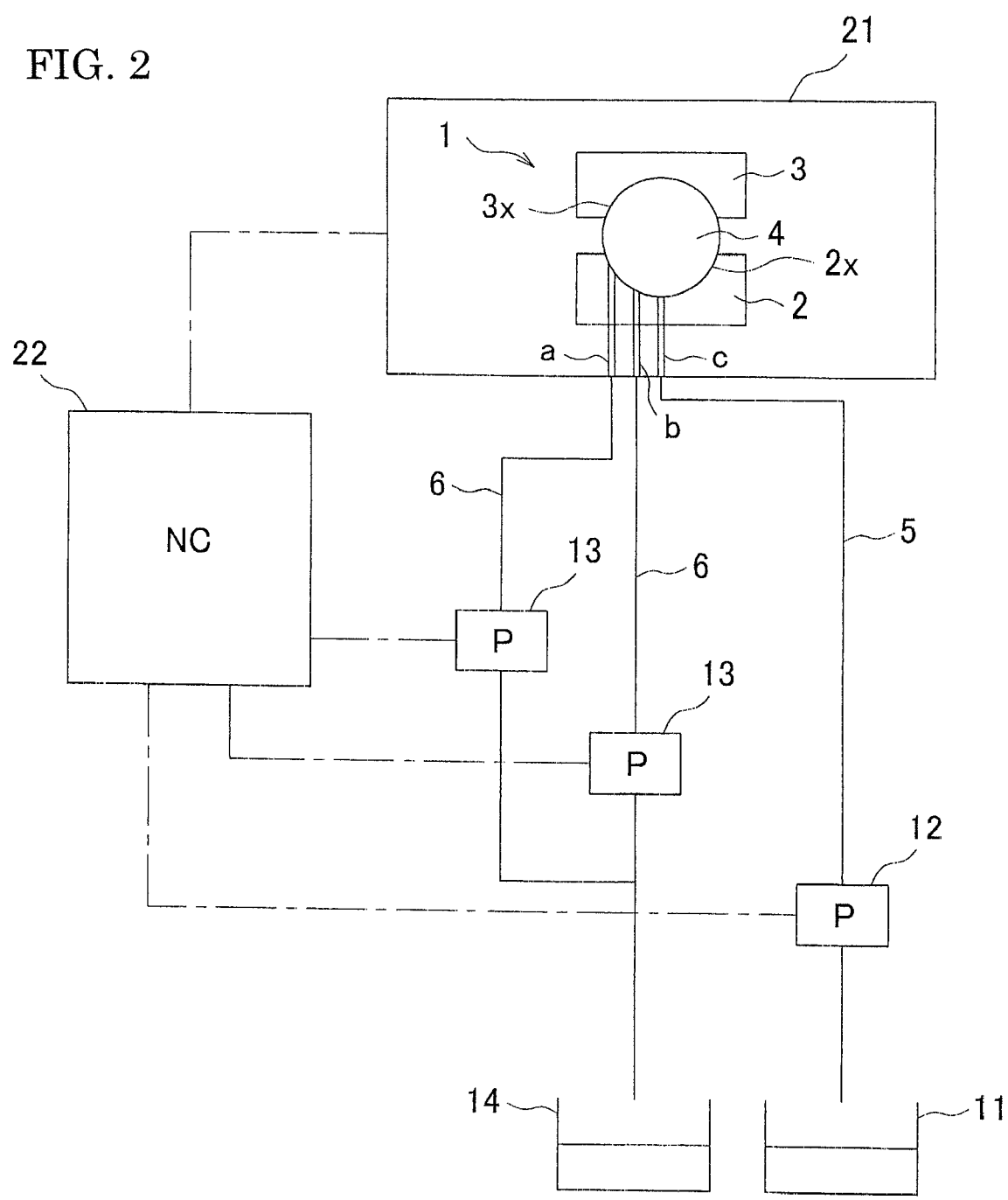
FIG. 2 is a circuit diagram of a bearing apparatus.

FIG. 1 is an explanatory diagram showing a section of a part of an outer ring 2 of a ball bearing 1. FIG. 2 is a circuit diagram of the bearing apparatus. In FIG. 2, for descriptive convenience, the ball bearing 1, a lubrication oil flowpath, and the like will be exaggeratedly shown or partially omitted.

The ball bearing 1 is constituted by an outer ring 2, an inner ring 3, and a plurality of balls (rolling elements) 4 provided between the outer ring 2 and the inner ring 3, and raceway grooves (rolling contact surface and therearound) $2x$ and $3x$ each having an arc-like section are provided on an inner circumference surface of the outer ring 2 and an outer circumference surface of the inner ring 3, respectively. A plurality of lubrication oil flow paths a to f penetrating from the outer circumference surface to the inner circumference surface (in particular, the raceway groove $2x$) are provided in the outer ring 2. Each lubrication oil flow paths open at different positions in a width direction being orthogonal to a rolling direction of the ball 4. In this case, the lubrication oil flow path c is defined as a lubrication oil supply path (referred to as a supply path hereinafter), and the other lubrication oil flow paths are defined as lubrication oil discharge paths (referred to as discharge paths hereinafter).

A supply pipe 5 is connected to a lubrication oil supply source 11 to communicate with the supply path c and lubrication oil is supplied into the raceway groove $2x$ (on the inner circumference surface of the outer ring 2) when a supply pump (supply means) 12 is driven. On the other hand, discharge pipes 6 are connected to the discharge paths a, b, d, e, and f, respectively. When a discharge pump (discharge means) 13 is driven, a pressure in the discharge pipe 6 becomes negative, and lubrication oil in the raceway groove $2x$ is sucked (discharged) to a discharge tank 14. The supply pump 12 and the discharge pumps 13 can be independently operated under the control of an NC device 22 (control means and selection means) 22 which controls the operation of a rotating shaft device 21 in which the ball bearing 1 is installed.

In this case, a state of lubrication oil in the ball bearing 1 in which the lubrication oil is supplied through the supply path c and lubrication oil is discharged from any one of the discharge paths a to f (except for the lubrication oil flow path c) will be described below.

The lubrication oil supplied through the supply path c spreads around the rolling contact surface of the ball 4 like a general fluid. More specifically, an amount of lubrication oil in the raceway groove $2x$ is in proportion to a range of the lubrication oil amount indicated by L in FIG. 1. The range of the lubrication oil amount in the raceway groove $2x$ is controlled to achieve control of the amount of lubrication oil in the raceway groove $2x$ (i.e., in the ball bearing 1). Therefore, a discharge path to be used is selected from the discharge paths a to f (except for c) each opening which is at different position in the width direction (for example, in FIG. 1, the discharge paths b and d are selected) to adjust the range of lubrication oil amount L, so that the amount of lubrication oil in the raceway groove $2x$ is controlled.

According to the ball bearing 1 and the bearing apparatus of the present invention, a plurality of lubrication oil flow paths a to f communicating with the raceway groove $2x$ are provided in the outer ring 2 of the ball bearing 1, and lubrication oil is supplied/discharged to the raceway groove $2x$, i.e., the ball bearing 1, by the lubrication oil flow paths. Therefore, in comparison with the conventional bearing, an amount of lubrication oil supplied into the ball bearing 1 and an amount of lubrication oil discharged from the ball bearing 1 can be accurately controlled. Consequently, damage to the bearing or deterioration of machine accuracy due to excess and deficiency of the lubrication oil in the bearing 1 can be effectively prevented, and an amount of the lubrication oil to be used can also be reduced.

When the lubrication oil is supplied/discharged by using the lubrication oil flow paths a to f, at least one of the lubrication oil flow paths a to f (the lubrication oil flow path c in the above embodiment) is used as a supply path, and the lubrication oil is supplied into the raceway groove $2x$ through the supply path c. On the other hand, discharge paths (in the above embodiments, the lubrication oil flow paths b and d) which discharge the lubrication oil are selected from the other lubrication oil flow paths to obtain the range of lubrication oil amount where the amount of lubrication oil in the raceway groove is appropriate, and the lubrication oil is discharged from the discharge paths b and d. More specifically, the openings of the plurality of lubrication oil flow paths a to f are at different positions in the width direction of the outer ring 2, and the lubrication oil flow paths used as the discharge paths can be selected and changed. As a result, the amount of lubrication oil in the ball bearing 1 can be easily controlled by selecting and changing the discharge paths. Therefore, maintaining an appropriate amount of lubrication oil in the ball bearing 1 can be realized with a simple configuration.

The configurations related to the bearing and the bearing apparatus according to the present invention are not limited to the aspects described in the embodiments, and configurations related to a circuit, control, and the like related to the bearing and the supply/discharge of the lubrication oil can be arbitrarily changed as needed in scope without departing from the purpose of the invention.

For example, the bearing is used as the ball bearing in the above embodiments. However, another bearing in which a rolling element is interposed between an outer ring and an inner ring, for example, a bearing, such as a roller bearing in which a rolling element, is cylindrical can be used without causing any problem.

In the above embodiments, the lubrication oil is supplied to an area near a rolling contact surface by using the lubrication oil flow path provided in the outer ring. However, the lubrication oil may be supplied to the bearing such that the lubrication oil is sprayed by a nozzle or the like as in the conventional technique. In this manner, even though the configuration in which the lubrication oil is supplied by the nozzle or the like is employed, the range of lubrication oil amount can be controlled as described in the above embodiments. Therefor, an advantage such as maintaining an appropriate amount of lubrication oil in the bearing is obtained.

Figure 3:
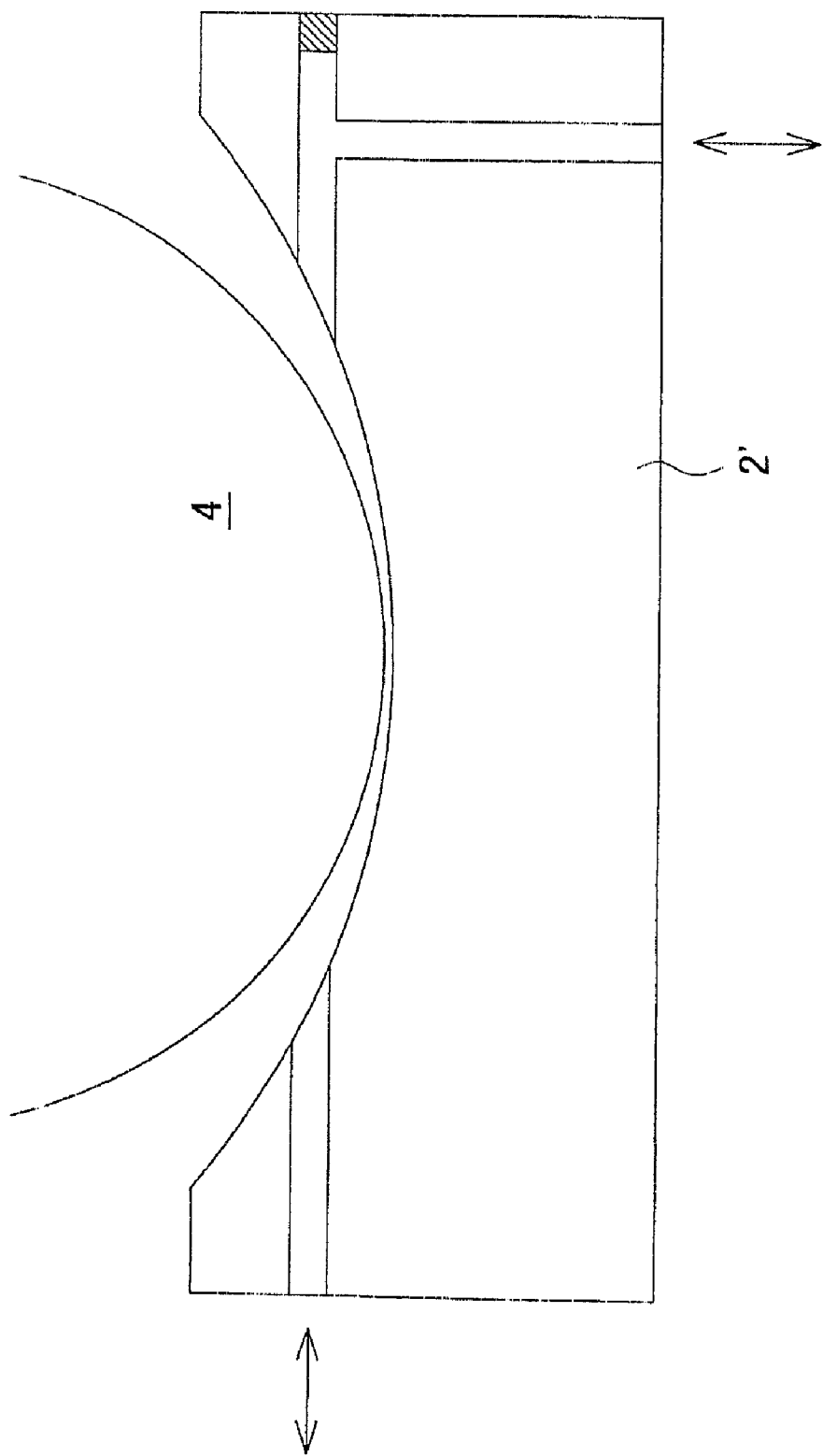
FIG. 3 is an explanatory diagram showing a change of a lubrication oil flow path.
Figure 4:
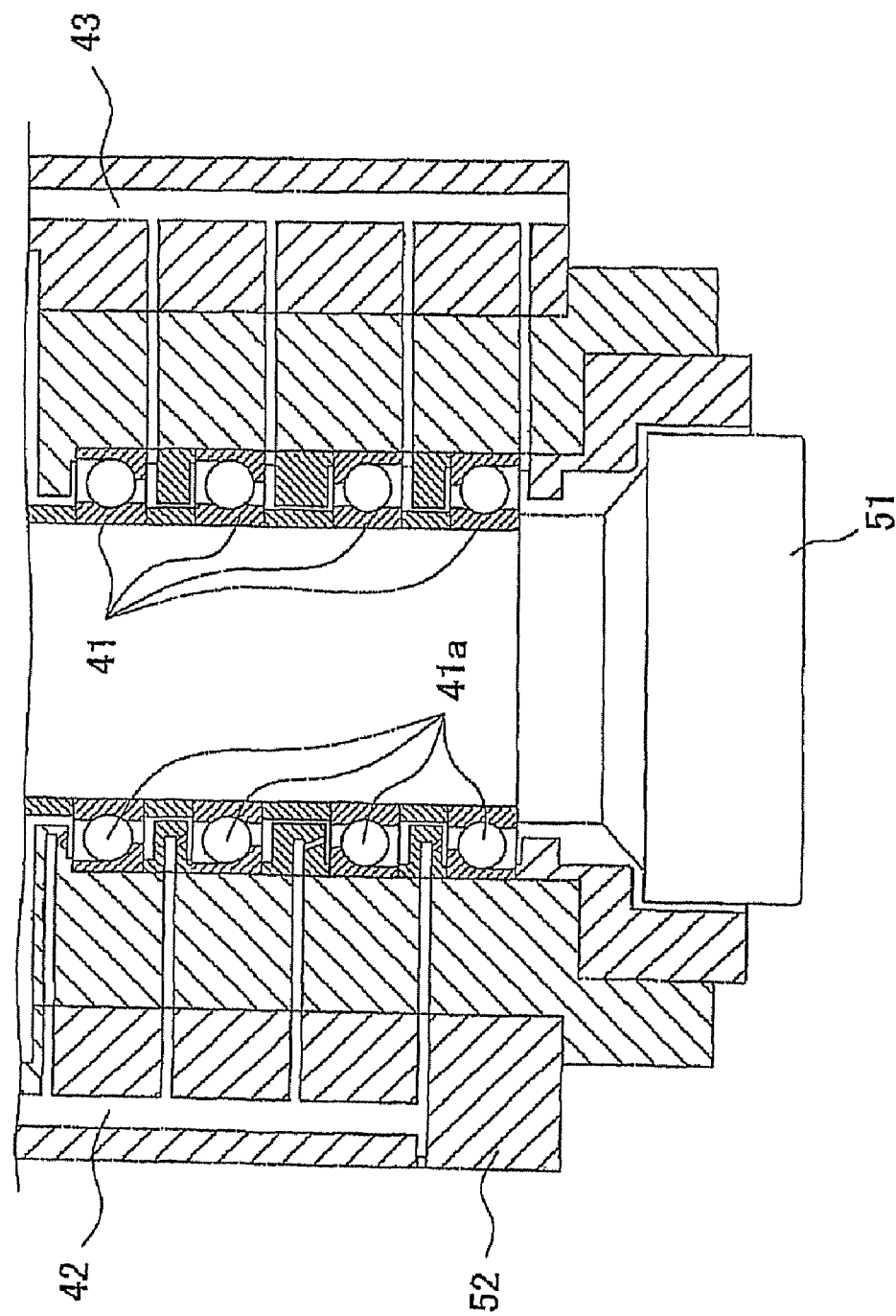
FIG. 4 is an explanatory diagram showing a conventional bearing and a conventional bearing apparatus.

Furthermore, in the embodiment, a lubrication oil flow path is provided to penetrate from the outer circumference surface of the outer ring to the inner circumference surface of the outer ring. However, as long as the lubrication oil flow path has openings near a rolling contact surface, a lubrication oil flow path may communicate from a side surface of an outer ring 2' to an inner circumference surface thereof, or to form a T-shaped lubrication oil flow path by the outer circumference surface and the inner circumference surface side, as shown in FIG. 3. In this manner, the shape or the like of the lubrication oil flow path can be arbitrary modified.

Furthermore, lubrication oil flow paths used as discharge paths are switched by using different discharge pumps to be driven in the above embodiment. However, the configuration in which discharge pipes connected to the discharge pump may be switched by using switching valves (selection means) or the like can be employed.

Furthermore, to connect the lubrication oil flow path provided in the outer ring to the supply pipe or the discharge pipe, the supply pipe or the discharge pipe can be directly inserted into the lubrication oil flow path provided in the outer ring. Alternatively, a second lubrication oil flow path may be provided in a housing of a rotating shaft device to connect the supply pipe or the discharge pipe.

In addition, a vibration sensor, a temperature sensor, a sound pressure sensor, or the like is arranged in the bearing, and detected results by the sensor can be used to determine the necessity of supply of lubrication oil, selection of discharge paths, and the like.

What is claimed is:

1. A bearing comprising a rolling element between an outer ring and an inner ring wherein
a plurality of lubrication oil flow paths communicating with an area near a rolling contact surface on which the rolling element rolls are provided in the outer ring to enable the lubrication oil to be discharged from inside of the bearing through one or more of the plurality of lubrication oil flow paths, openings of the plurality of lubrication oil flow paths near the rolling contact surface are at different positions in a width direction being orthogonal to a rolling direction of the rolling element and are positioned at different distances from a center, and selection means selects the one or more of the plurality of openings used to discharge lubrication oil from inside of the bearing.

2. The bearing according to claim 1, wherein
at least one of the plurality of lubrication oil flow paths is used as a lubrication oil supply path to supply lubricant oil into the bearing.

3. The bearing apparatus to control an amount of lubrication oil in the bearing according to claim 1, comprising:
supply means to supply lubrication oil into the bearing; discharge means to discharge the lubrication oil from inside of the bearing through one of the plurality of lubrication oil flow paths; and control means to arbitrarily operate the supply means and the discharge means.

4. A bearing comprising a rolling element between an outer ring and an inner ring wherein
a plurality of lubrication oil flow paths communicating with an area near a rolling contact surface on which the rolling element rolls are provided in the outer ring to enable the lubrication oil to be discharged from inside of the bearing through one or more of the plurality of lubrication oil flow paths, and openings of the plurality of lubrication oil flow paths near the rolling contact surface are at different positions in a width direction being orthogonal to a rolling direction of the rolling element, wherein at least one of the plurality of lubrication oil flow paths is used as a lubrication oil supply path to supply lubricant oil into the bearing.

5. The bearing apparatus to control an amount of lubrication oil in the bearing according to claim 4, comprising:
supply means to supply lubrication oil into the bearing; discharge means to discharge the lubrication oil from inside of the bearing through the one or more of the plurality of lubrication oil flow paths; and control means to arbitrarily operate the supply means and the discharge means.

6. The bearing apparatus according to claim 5, further comprising selection means which selects the one or more of the plurality of lubrication oil flow paths used to discharge the lubrication oil from inside of the bearing.

7. A bearing comprising a rolling element between an outer ring and an inner ring wherein
a plurality of lubrication oil flow paths communicating with an area near a rolling contact surface on which the rolling element rolls are provided in the outer ring to enable the lubrication oil to be discharged from inside of the bearing through one or more of the plurality of lubrication oil flow paths, and openings of the plurality of lubrication oil flow paths near the rolling contact surface are at different positions in a width direction being orthogonal to a rolling direction of the rolling element,
supply means to supply lubrication oil into the bearing; discharge means to discharge the lubrication oil from inside of the bearing through the one or more of the plurality of lubrication oil flow paths; and control means to arbitrarily operate the supply means and the discharge means.

8. The bearing apparatus according to claim 7, further comprising selection means which selects the one or more of the plurality of lubrication oil flow paths used to discharge the lubrication oil from inside of the bearing.

9. A bearing comprising a rolling element between an outer ring and an inner ring wherein
a plurality of lubrication oil flow paths communicating with an area near a rolling contact surface on which the roll element rolls are provided in the outer ring to enable the lubrication oil to be discharged from inside of the bearing through one or more of the plurality of lubrication oil flow paths, and openings of the plurality of lubrication oil flow paths near the rolling contact surface are at different positions in a width direction being orthogonal to a rolling direction of the rolling element, wherein at least one of the plurality of lubrication oil flow paths is used as a lubrication oil supply path to supply lubricant oil into the bearing,
supply means to supply lubrication oil into the bearing; discharge means to discharge the lubrication oil from inside of the bearing through the one or more of the plurality of lubrication oil flow paths; and control means to arbitrarily operate the supply means and the discharge means.

10. The bearing apparatus according to claim 9, further comprising selection means which selects the one or more of the plurality of lubrication oil flow paths used to discharge the lubrication oil from inside of the bearing.

11. A bearing comprising a rolling element between an outer ring and an inner ring wherein a plurality of lubrication oil flow paths communicating with an area near a rolling contact surface on which the rolling element rolls are provided in the outer ring to enable the lubrication oil to be discharged from inside of the bearing through one or more of the plurality of lubrication oil flow paths, and openings of the plurality of lubrication oil flow paths near the rolling contact surface are at different positions in a width direction being orthogonal to a rolling direction of the rolling element, supply means to supply lubrication oil into the bearing; discharge means to discharge the lubrication oil from inside of the bearing through one of the plurality of lubrication oil flow paths; control means to arbitrarily operate the supply means and the discharge means; and selection means which selects the one or more of the plurality of lubrication oil flow paths used to discharge the lubrication oil from inside of the bearing.

* * * * *